(No Model.)
O. BOITEAU.
GRAB HOOK.
No. 443,473.
Patented Dec. 23, 1890.
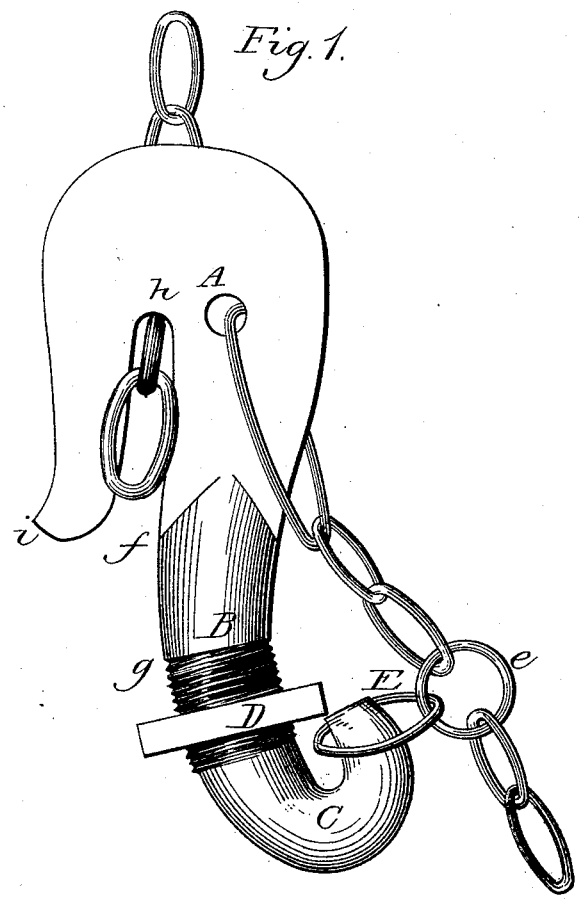
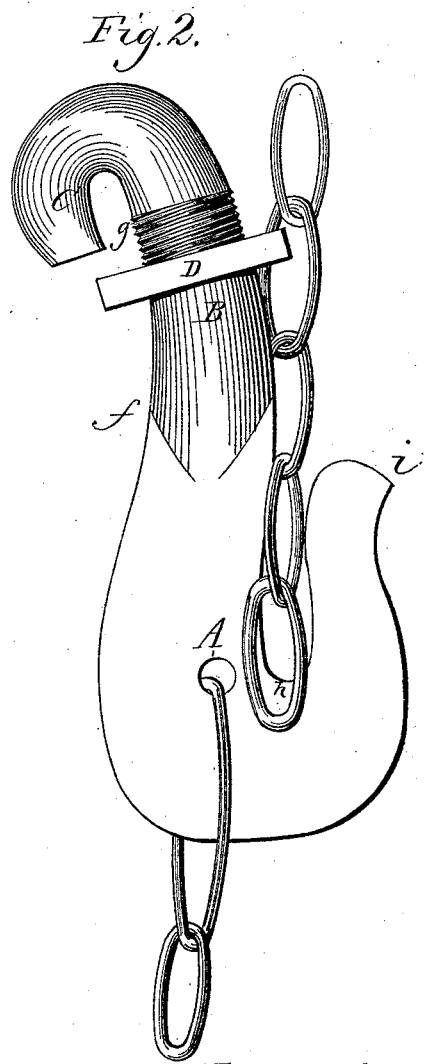
Witnesses
Joseph Gay
Joseph Charbonneau
Inventor
Octave Boiteau

UNITED STATES PATENT OFFICE.

OCTAVE BOITEAU, OF EAGLE POINT, WISCONSIN.

GRAB-HOOK.

SPECIFICATION forming part of Letters Patent No. 443,473, dated December 23, 1890.

Application filed October 13, 1890. Serial No. 368,023. (No model.)

*To all whom it may concern:*

Be it known that I, OCTAVE BOITEAU, a citizen of the United States, of the town of Eagle Point, county of Chippewa, and State of Wisconsin, have invented a certain new and useful Grab-Hook, of which the following is a specification.

The object of my invention is to fasten and unfasten with ease, celerity, and security, avoiding the ordinary dangers and delays accompanying such operation with ordinary grab-hooks, the chains used in binding loads of logs, timber, lumber, &c., on sleds, wagons, trucks, &c., and avoid the accidental refastening of the chains in the hooks after they are once disengaged, which often happens with ordinary grab-hooks, thereby causing great delay and annoyance and danger to operating-hands, and even often necessitating the cutting of the chains.

It consists in a grab-hook peculiarly constructed and peculiarly fastened to the chain, which I will first fully describe with reference to the drawings, and then point out in the claim.

Figure I is a view of the hook as fastened to the chain when the load is bound. Fig. II is the hook just getting disengaged from the chain, showing its reverse position and showing the impossibility of it catching the chain again.

A is the hole to fasten the hook to the chain.

B is the tail or lower end of the hook, terminating in a small blunt or squared end hook C.

D is a nut threaded on the tail of the hook B.

E is an extra link, and $e$ is a ring placed in the continuation of the chain opposite the terminal hook C.

This grab-hook where it grabs the chain is similar to other grab-hooks, except that it is flattened instead of square. It is made flat to the tail B, where it is rounded to its end; or it may be rounded from the point $f$, where it commences to bend and terminates in a hook C for the purpose of fastening at that point with the chain by means of the extra link E and ring $e$. From the point $g$ the tail is threaded to receive the nut D, which locks the link E after it is fastened.

The mechanism of the application of this grab-hook is such that the hole A, being placed in the head of the hook with reference to the inside curve of the hook $h$ or grabbing-point resting on the binding-chain at such a point that it forms a leverage the fulcrum of which is the hole itself A, the weight of the lever, the inside curve of the hook $h$, and the power of the lever, the tail or lower end of the hook B C, which, when liberated from the link E, will at once reverse and disengage from the binding-chain, as shown in Fig. II, and will fall to the ground without danger of catching the chain again, for the very reason that it is reversed and cannot assume any other position by itself, gravitation thus carrying it.

In applying this hook on the chain it is carried and applied on the chain in the horizontal position, after tightening the chain to its utmost, leaving no slack as with the ordinary grab-hooks, which have to be applied in the vertical position, thereby making a slack in the chain measuring the distance comprised between the end of the hook $i$ to the curve of the hook $h$, but binding still more as the tail of the hook is lowered to be fastened to the chain by the link E in proportion to the distance of the hole A from the curve $h$. Now the link E is slipped on the hook C and the nut D is screwed down on the end of the hook, thereby locking the fastening securely. The fastening of the power of the lever (the tail of the hook being so placed that it is not necessary to move that power further to disengage the hook after unscrewing the nut to unlock the link E) makes it very easy to unfasten, the least blow being sufficient to start and raise the link E and cause it to slip over the end of the hook, while if it were so placed that the power of the lever would have to be moved further it might be very difficult or even impossible to unfasten it on account of the excessive weight of the load. The ring $e$ is deemed necessary to give perfect freedom of the end of the link E, so that it will not at any time from the tension of the chain crowd against the ends of the other links, and thereby be pulled or crowded against the nut D and cause the fastening to tighten and be hard to unlock.

Having thus described my invention, what I claim as new, and desire to secure by Letters Patent, is—

The combination, with a grab-hook having a fastening-hole in the head thereof, a tail threaded adjacent to the hooked portion, and a terminal hook, of a nut and a chain, substantially as set forth.

OCTAVE BOITEAU.

Witnesses:
NELLIE M. LEONARD,
JOHN S. MONAT.